US011418606B2

(12) United States Patent
Battle et al.

(10) Patent No.: US 11,418,606 B2
(45) Date of Patent: Aug. 16, 2022

(54) COMPUTING RESOURCE MANAGEMENT SYSTEM

(71) Applicant: Microsoft Technology Licensing, LLC, Redmond, WA (US)

(72) Inventors: Ryan Battle, Austin, TX (US); Costel Radu, Redmond, WA (US); Roberto Santos, Sammamish, WA (US); Anush Prabhu Ramachandran, Bellevue, WA (US); Robert Hall, Bellevue, WA (US); Vladimir Lozhkin, Bellevue, WA (US); Yagnesh Setti Subramanian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/081,533

(22) Filed: Oct. 27, 2020

(65) Prior Publication Data

US 2021/0067594 A1 Mar. 4, 2021

Related U.S. Application Data

(63) Continuation of application No. 14/958,571, filed on Dec. 3, 2015, now Pat. No. 10,848,574.

(60) Provisional application No. 62/174,156, filed on Jun. 11, 2015.

(51) Int. Cl.
*H04L 67/51* (2022.01)
*H04L 67/63* (2022.01)
*H04L 43/16* (2022.01)
*H04L 67/50* (2022.01)
*G06F 9/50* (2006.01)

(52) U.S. Cl.
CPC ............ *H04L 67/16* (2013.01); *G06F 9/5011* (2013.01); *H04L 43/16* (2013.01); *H04L 67/22* (2013.01); *H04L 67/327* (2013.01)

(58) Field of Classification Search
CPC ......... H04L 67/16; H04L 43/16; H04L 67/22; H04L 67/327; H04L 29/08144; H04L 67/1002; H04L 47/20; H04L 47/822; H04L 47/823; H04L 41/5083; G06F 9/5011; G06Q 10/06
USPC ......................................................... 709/206
See application file for complete search history.

(56) References Cited

U.S. PATENT DOCUMENTS

| 2006/0026220 A1* | 2/2006 | Margolus ............ G06F 16/2358 |
| 2007/0106798 A1* | 5/2007 | Masumitsu ...... G06Q 10/06316 709/226 |
| 2015/0149637 A1* | 5/2015 | Chin ........................ G06F 9/46 709/226 |

* cited by examiner

*Primary Examiner* — Tan Doan
(74) *Attorney, Agent, or Firm* — Christopher J. Volkmann; Kelly, Holt & Christenson, PLLC

(57) ABSTRACT

A computing system comprises, in one example, a service deployment system configured to deploy one or more service instances into a service instance pool, wherein each service instance comprises a computing resource configured in accordance with a service topology and allocable in response to a service request, and a pool management system configured to monitor consumption information related to consumption of the service instance pool and to determine whether to deploy one or more additional service instances to the service instance pool based on the consumption information relative to a threshold metric, wherein the pool management system comprises a deployment controller configured to control the service deployment system to deploy the one or more additional service instances to the service instance pool.

18 Claims, 7 Drawing Sheets

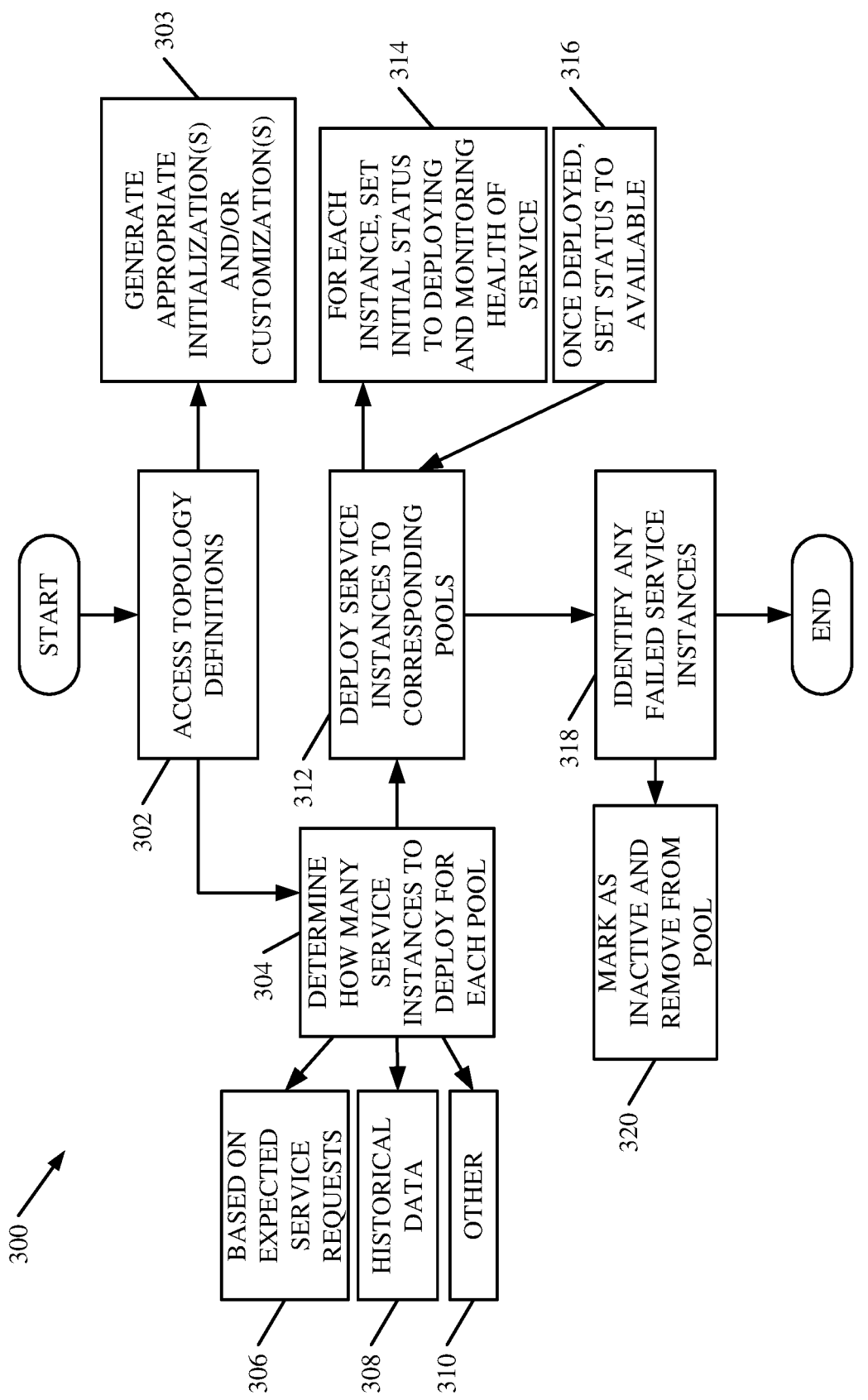

COMPUTING RESOURCE MANAGEMENT SYSTEM

CROSS-REFERENCE TO RELATED APPLICATIONS

The present application is a continuation of and claims priority of U.S. patent application Ser. No. 14/958,571, filed Dec. 3, 2015, which is based on and claims the benefit of U.S. provisional patent application Ser. No. 62/174,156, filed Jun. 11, 2015, the contents of which are hereby incorporated by reference in their entirety.

BACKGROUND

Remote or distributed computing environments, such as cloud computing environments, deliver services over a network, such as the internet or other network, using appropriate protocols. For example, cloud computing providers deliver applications over a wide area network and they can be accessed through a web browser or any other computing component. Software or components of the computing architecture as well as the corresponding data, can be stored on servers at a remote location.

As one example, cloud computing services may provide access to an enterprise application that provides functionality for an enterprise to store data and commonly includes process functionality that facilities performing various processes or tasks on the data. Users log into or otherwise access the application in order to perform the processes and tasks.

The discussion above is merely provided for general background information and is not intended to be used as an aid in determining the scope of the claimed subject matter.

SUMMARY

A computing system comprises, in one example, a service deployment system configured to deploy one or more service instances into a service instance pool, wherein each service instance comprises a computing resource configured in accordance with a service topology and allocable in response to a service request, and a pool management system configured to monitor consumption information related to consumption of the service instance pool and to determine whether to deploy one or more additional service instances to the service instance pool based on the consumption information relative to a threshold metric, wherein the pool management system comprises a deployment controller configured to control the service deployment system to deploy the one or more additional service instances to the service instance pool.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 is a flow diagram of one example of a method for deploying service instances.

DETAILED DESCRIPTION

Figure 1A:
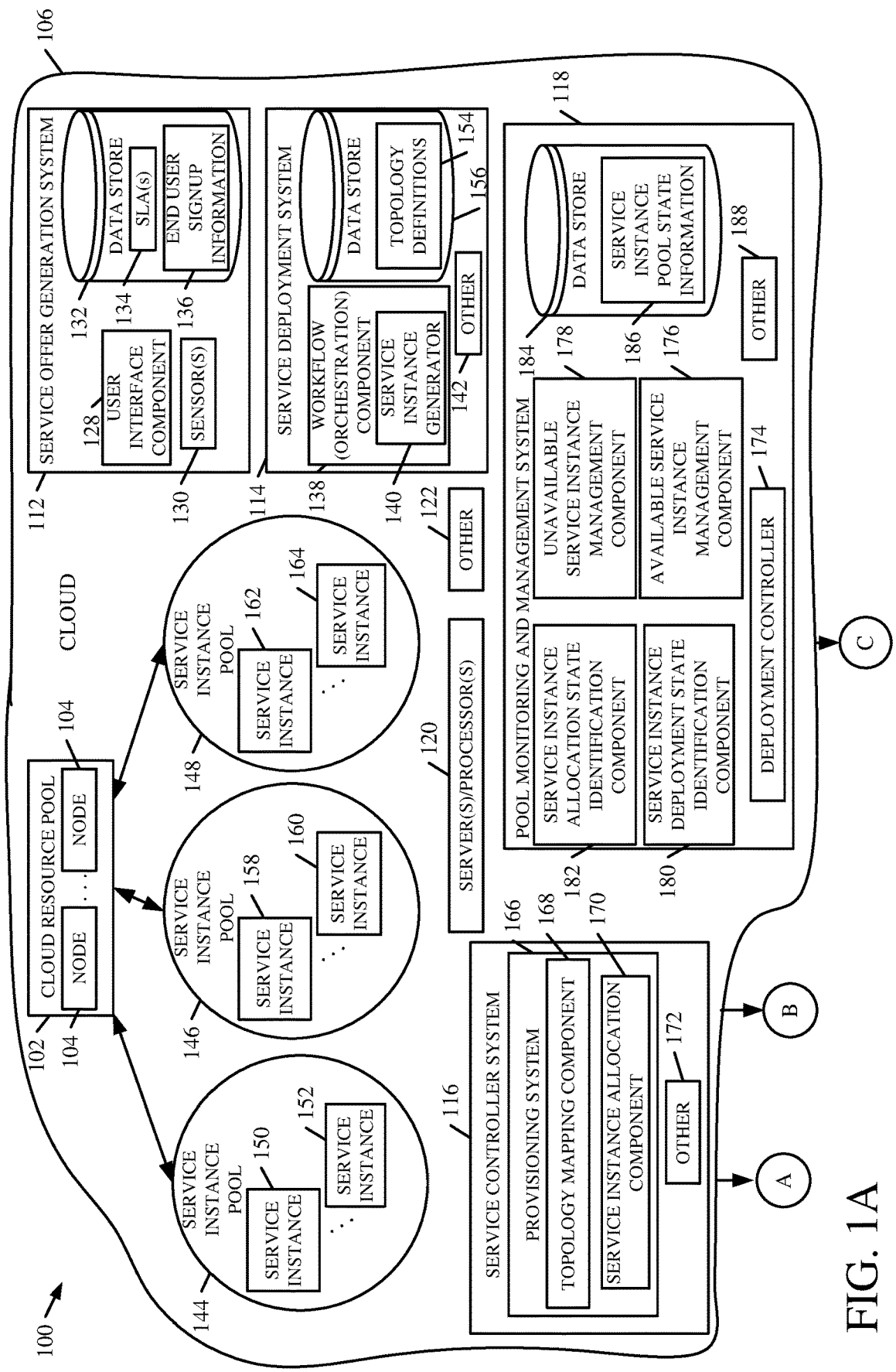
FIGS. 1A and 1B (collectively referred to as FIG. 1) illustrate a block diagram of one example of a computing architecture.
Figure 1B:
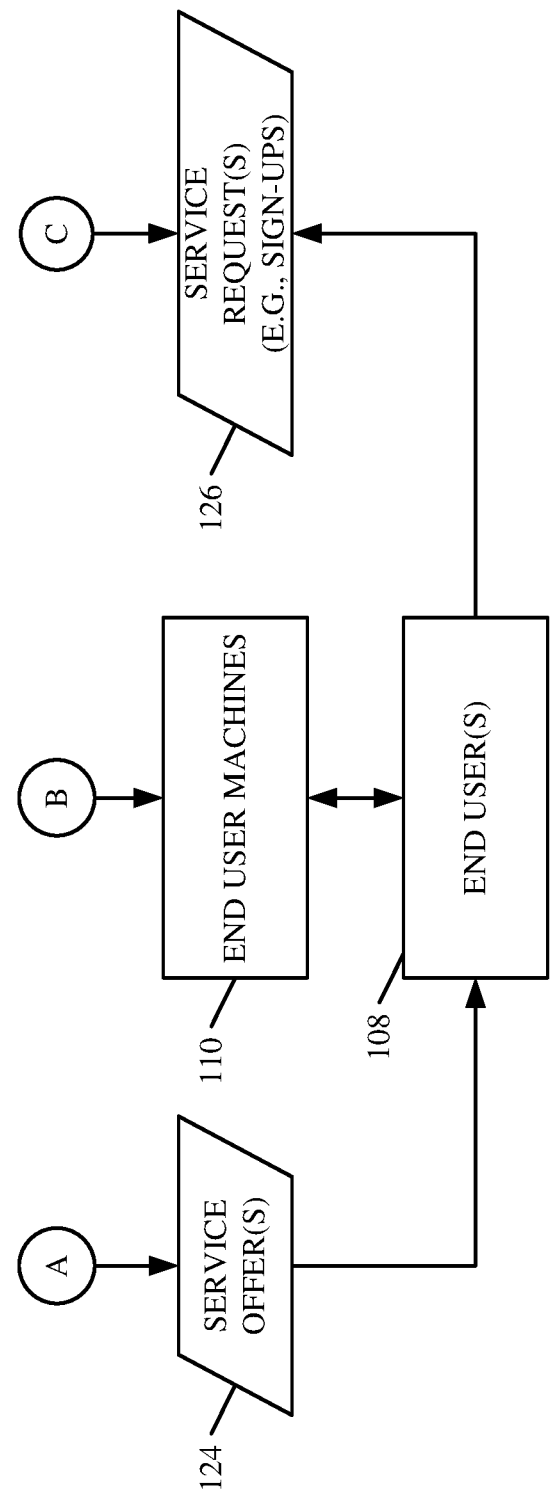

FIGS. 1A and 1B (collectively referred to as FIG. 1) is a block diagram of one example of a computing architecture 100 in which embodiments described herein are applicable. Computing architecture 100 includes one or more computing systems that provide computing resources for end user services. In the illustrated example, computing architecture 100 comprises a remote or distributed server environment, such as but not limited to a cloud (referred to herein as cloud computing architecture 100). Of course, other types and forms of computing environments are within the scope of the present disclosure.

As discussed in further detail below, one example described herein provides resource deployment and management functionality on top of, or in addition to, a cloud computing platform that includes a collection of integrated services (e.g., analytics, computing, database, mobile, network, storage, web, etc.). Briefly, however, cloud computing architecture 100 includes a cloud resource pool 102 that provide computation, software, data access, and storage services. Cloud resource pool 102 includes a plurality of resource nodes 104 that each represent one or more underlying infrastructure resources, which can be of different types, in cloud 106 that one or more users (e.g., end users 108) can access using machine(s) 110. In one example, cloud resources (e.g., data center resources, etc.) can be placed into different categories, including compute resources, network resources, and storage resources.

Before discussing architecture 100 in further detail, it is noted that architecture 100 provides significant technical advantages. Some examples are discussed below. Briefly, however, when an end user desires access to a service, a cloud computing system typically configures various resources for deployment to the end user in a manner that does not meet desired experience goals (e.g., by exceeding the terms of an SLA). Further, the resource configuration may not be narrowly tailored to the end user's needs. For example, there may not be enough (or to many) resources deployed for the end user's requirements. Additionally, the underlying computing resources being consumed may be physically located in a geographic region that results in decreased performance and data latency, or the resources may be shared by other tenants/organizations.

In accordance with one aspect, architecture 100 groups service instances into service instance pools based on topology definitions or other configuration information. Each service instance can be generated from a unique set of one or more underlying computing resources. Alternatively, or in addition, two or more service instances can share some or all of the same computing resources. In either case, service instances with similar configurations are grouped or pooled together and individually monitored and managed to ensure that the pools are sufficiently populated/replenished with service instances to surface subsequent service requests in a timely manner. The service instances can be generated Further, architecture 100 is configured to provide an end user with more precisely tailored service instances so as to limit infrastructure burden such that there are enough resources for the end user, but less unused resources that the end user either did subscribe to or signup for. These unused resources would otherwise be allocated to the end user, but not used (or used minimally).

In FIG. 1, examples of end user machines 110 include, but are not limited to, desktop computers, laptop computers, servers, automobile systems, and tablet computers or other mobile devices, such as palm top computers, cell phones, smart phones, multimedia players, personal digital assistants, etc.

Cloud resources in pool 102 may communicate with one another and can be grouped physically or virtually, in one or more networks. Using cloud resource pool 102, architecture 100 can offer infrastructure, platforms, and/or software in a manner that does not require end-user knowledge of the physical location or configuration of the system that delivers the services. Further, in cloud resource pool 102, resources can be pooled to serve multiple end users in a single or multi-tenant model. As used herein, a "tenant" is an owner or operator of a service deployment. For example, each tenant in a multi-tenant scenario can correspond to a separate organization. The term "end user" will be used herein to refer to a single end user as well as a group of end users, such as an organization or other tenant.

In one example, the cloud computing architecture includes virtual machines corresponding tenants and an underlying hypervisor or virtual machine monitor (VMM) that creates and runs the virtual machines. A hypervisor can comprise computer software, firmware, and/or hardware, and provide and manage machine-level services to each virtual machine.

In various examples, cloud computing delivers the services over a wide area network, such as the internet, using appropriate protocols. For instance, cloud computing providers deliver applications over a wide area network and they can be accessed through a web browser or any other computing component. Software or components of the computing architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and/or private) provides substantially seamless pooling of resources, as well as a reduced need to manage and configure underlying hardware infrastructure.

In one example, a public cloud is managed by a vendor and can support multiple end users using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

A "service" provides useful functions to its end users. In one example, a service models a process or application such as, but not limited to, an email application, an office productivity application, a financial application, a document sharing and/or collaboration application, a scheduling application, and/or an enterprise application or other business application (e.g., an enterprise resource planning (ERP) application, a customer resource management (CRM) application, a line-of-business (LOB) application).

As illustrated in FIG. 1, architecture 100 includes a service offer generation system 112, a service deployment system 114, a service controller system 116, and a pool monitoring and management system 118. Architecture 100 also includes server(s) and/or processor(s) 120, and can include other items 122 as well. In one example, server(s)/processor(s) 120 comprises a computer processor with associated memory and timing circuitry (not shown). A computer processor is a functional part of architecture 100 and is activated by, and facilitates the functionality of, other systems, components, and items in architecture 100.

It is noted that FIG. 1 shows a variety of different functional blocks. It will be noted that the blocks can be consolidated so that more functionality is performed by each block, or they can be divided so that the functionality is further distributed. Further, it is noted that systems 112, 114, 116, and 118 can be local to one another or can be located remotely from each other. For example, any one of systems 112, 114, 116 and 118 can be located remotely (such as on a different server in a different geographic region) than one or more of the other systems. Further, one or more of systems 112, 114, 116, and 118 can be located locally or remotely from the cloud computing resources in cloud resource pool 102. It should also be noted that the discussion herein includes one or more data stores. The data stores can be any of a variety of different types of data stores. Further, the data in the data stores can be consolidated into a same data store, and can be stored in multiple additional data stores as well. Also, the data stores can be local to the environments, agents, modules, and/or components that access them, or they can be remote therefrom and accessible by those environments, agents, modules and/or components. Similarly, some can be local while others remote.

Service offer generation system 112 is configured to generate one or more service offers 124 and to receive one or more service requests 126 from end users 108 in response to service offers 124. In the illustrated example, service offer 124 comprises an end user offering for an application or other service, which can be of any type, such as the application types discussed above. Service offer 124 is thus, in this example, end user facing and specifies service requirements in end user terms. For example, service offer 124 can be defined for a particular period of time, such as a subscription period. In one example, an end user responds to a service offer 124 with a service request 126 based on terms defined in a service level agreement (SLA). An example SLA defines service availability, performance, usage, etc. for a service to be consumed by an end user. It can also define data retention policies with regard to end user data associated with the service.

In response to service request 126, the end users automatically receive access to the end or entry points to the services. In one example, the offered service is delivered to the end user organization for the organization's independent use. An offered service can be defined by a service plan. A service plan defines attributes of the service, or a service specification, such as, but not limited, an application or product type, type(s) of resources to consume, a time period for the service, and/or a resource allocation region (e.g., data center location(s)) where the resources will be allocated physically reside.

System 112 generates, in one example, user interface displays using a user interface component 128 which are presented to end user 108 and prompt the end user for the service request 126. System 112 also can include one or more sensors 130 that are configured to detect inputs to system 112. In one example, one or more of systems 114, 116, and 118 can include sensors configured to detect inputs to those systems as well.

In one example, user interface component 128 generates user interface displays with user input mechanisms that sense physical activities, for example by generating user interface displays that are used to sense user interaction with architecture 100. The user interface displays can include user input mechanisms that sense user inputs in a wide variety of different ways, such as point and click devices, a keyboard (either virtual or hardware), an/or a keypad. Where the display device used to display the user interface displays is a touch sensitive display, the inputs can be displayed as touch gestures. Similarly, the user inputs can illustratively be provided by voice inputs or other natural user interface input mechanisms as well.

System 112 also includes a data store 132 that stores the SLAs 134 and the end user signup information 136. Again, the end user signup information can define the terms of the service that is being requested by end user 108 and for which service instances are allocated to the end user.

Service deployment system 114 includes a workflow (orchestration) component 138 which includes a service instance generator 140 configured to generate service instances from the cloud computing resources in pool 102. In deploying a service instance, in one example system 114 utilizes initialization scripts for the service instance which configures various components of the service instance, such as networks, storage, and operation system functions. System 114 can include other items 142 as well.

A service instance (or service unit) comprises logical grouping of target cloud computing resources (e.g., one or more processing units, memory, storage, applications, virtual machines, networks, network bandwidth, etc.) that collectively hosts one or more applications or other services. In one example, a service instance is a set of infrastructure targets (e.g., hosts, databases, application services, etc.) that can be allocated to an end user and function together to host the one or more applications or other services.

In one example, each service instance is substantially independent of other service instances, and is assigned or allocated to only one tenant. Thus, a particular organization gets a set of resources for specific use by that organization. The set of resources in the service instance are therefore not shared among multiple tenants, and the activities of one tenant in their service instance does not significantly affect the performance of another service instance used by a different tenant.

As shown in FIG. 1, the service instances are deployed into service instance pools 144, 146, and 148. In FIG. 1, three service instance pools are shown for the sake of illustration, but not by limitation. In other examples, less than or more than three service instance pools can be utilized. In one particular example, the number of service instance pools can be on the order of tens, hundreds, or thousands of different pools.

Each service instance pool comprises a grouping of service instances, with each service instance having similar resource(s) that can be consumed by end users signing up for a same or similar service. That is, in one example, each service instance in a given service instance pool have configurations that are substantially similar to one another. A service instance can be generated from a single computing resource, or from multiple computing resources. Further, some or all of the service instances can each have a unique set of underlying computing resources, or can share computing resource(s) to some extent.

The service instances within a given pool can be provisioned for one or more different end users. As discussed in further detail below, in one example, each pool is managed to have an optimum, or near optimum, number of available service instances so as to facilitate servicing future end user service requests (e.g., to meet SLAs with the end users) without significantly burdening the infrastructure by unnecessarily tying up resources with a large number of unconsumed service instances.

In one example, an end user "consumes" the underlying computing resource(s) in a service instance through end user machines 110 (e.g., a client device or other module). To illustrate, end user 108 uses machine 110 which communicates with the computing resource(s) in cloud 106 through a network to invoke and interact with the computing resource (s). In one example, this includes sending data to and receiving data from the computing service. For instance, a thin client device communicates with the service in cloud 106 and provides end user 108 with access to the service functionality through a browser or other interface.

Further, it is noted that the service instance pools can be distributed across a number of different geographies. For example, different service instance pools may have resources from data centers in different geographic regions (e.g., central United States, western Europe, east Asia, etc.). Further, service instances within a same pool may have resources from these different geographic regions. In one example, service instance pool 144 includes a service instance 150 having some or all of its resources in a first geographic region (e.g., central United States) and a second service instance 152 having some or all of its resources in a second geographic region (e.g., eastern Europe).

In the illustrated example, the service instance pools are deployed in accordance with pre-defined service topologies, that are defined by topology definitions 154. The topology definitions 154 can be stored in a data store 156 that is maintained or otherwise accessed by service 114. The service instances in the service instance pools 144, 146, and 148 are deployed in accordance with these topology definitions. In one example, in each service instance pool, all service instances are defined in accordance with a same service topology definition.

A service topology defines a service architecture, such as a set of characteristics for services. A service topology is a representation of a system made up of any number N component service parts delivered together for the purpose of providing an application or other service. For example, a topology comprises a template defined in metadata that specifies the architecture or shape of a service instance in terms of size and type of resources to be deployed to the service instance. A topology definition can also define how the service instance scales, as well as the configurations of and interactions (or other associations) between the underlying cloud computing resource components deployed in the service instance. A service topology definition can also define interactions with or dependencies to other services, as well as initializations and customizations to a service when it is deployed.

A topology definition can be defined by a developer, for example, based on any of a variety of considerations. For example, a topology definition can be defined based on a type of application being deployed, a version of the application, a capacity of the application, the resources that will be consumed, a number of concurrent users that will access the application, a time period during which the user will access the application, and/or a geography (e.g., where the users will access the application or other service from). In one example, each topology definition 154 defines to which service instance pool the service instances are to be deployed. For example, one topology definition 154 comprises a trial application definition (such as a CRM application trial). Another example of a topology definition 154 comprises a small topology that defines service instances to be consumed by a relatively small number of users (e.g., less than 10 concurrent users). Yet another example of a topology definition 154 comprises a medium topology that defines service instances to be used by a larger number of users than the small topology definition (e.g., between 10 and 50 concurrent users). Yet another topology definition 154 can comprise a large topology that defines services to be used by a large number of users (e.g., more than 100 concurrent users). As such, in one example, the service instances 150 and 152 (as well as any other service instance in pool 144) are defined in accordance with a first one of the topology definitions. Similarly, the service instances 158 and 160 (as well as any other service instances in pool 146) are defined in accordance with a second one of the topology definitions, and service instance 162 and 164 (as well as any other service instances in pool 148) are defined in accordance with a third topology definition.

As discussed in further detail below, this facilitates provisioning of services to an end user service request that is more precisely tailored to the need of the end user request such that enough resources are allocated without significant misallocation of the resources. That is, an end user can be attached to the appropriate service instance so that there are little if any, unused resources allocated to the end user.

As shown in FIG. 1, service controller system 116 includes a provisioning system 166, which itself includes a topology mapping component 168 and a service instance allocation component 170. System 116 can include other items 172 as well.

The topology mapping component 168 is configured to map a topology to a given offered service. For example, for a given service offer 124 generated by system 112, component 168 identifies the appropriate topology, and therefore the appropriate service pool 144, 146, or 148 for which to allocate service instances for the service.

Service instance allocation component 170 is configured to allocate or provision the service instances to an end user in response to service requests 126. In one example, topology mapping component 168 uses information defined by system 112 in generating service offer 124 to identify the appropriate topology. As mentioned above, a service offer can include a service plan that itself defines the appropriate topology or service instance pool from which service instances are to be allocated.

As shown in FIG. 1, pool monitoring and management system 118 includes a deployment controller 174 that is configured to control service deployment system 114 to deploy service instances, and management components configured to manage the service instances. In the illustrated example, an available service instance management component 176 is configured to manage available service instances and an unavailable service instance management component 178 is configured to manage unavailable service instances.

An example of an available service instance is a service instance that has been successfully deployed by system 114, but has not been provisioned or allocated to an end user. Examples of unavailable service instances includes instances that are in the process of being deployed by system 114, have failed deployment by system 114, and/or have been allocated to an end user. Also, unavailable service instances can include service instances that have been de-allocated (e.g., the service has ended) but are not available for provisioning.

In one example, unavailable service instance management component 178 facilitates the removal of expired service instances by identifying whether the unavailable service instances are expired service instances (for example by accessing state information 186). Also, component 178 can determine whether the data of an expired service instance is to be preserved and/or whether the preserved data needs to be migrated to a new service instance. In one example, workflow component 138 orchestrates the backup/migration of the data to a new service instance. For example, it can deploy a new service instance populated with the preserved data.

An expired service instance can be deleted and/or cleansed to remove client data so that its resources can be recycled. In one example, a cleansed service instance can be placed back into the same service instance pool within which it was previously deployed. In another example, the resources of the cleansed service instance are placed back in resource pool 102 for deployment in any one of the service instance pools 144, 146, or 148.

In one example, components 176 and 178 utilize state information for the service instances to determine whether the service instances are available or unavailable. The state information can include a deployment status and/or an allocation status. Thus, system 118 illustratively includes a service instance deployment state identification component 180 and a service instance allocation state identification component 182. The state information obtained by components 180 and 182 can be stored in a data store 184. This is represented by service instance pool state information 186.

By way of example, component 180 can identify a service instance as having one of a plurality of different deployment statuses. Examples include, but are not limited to, a "deployed" state in which the resources in the service instance have been deployed and are operational, and a "notdeployed" status that indicates that the resources have not been deployed or are in the process of being deployed. Other states can include a "starting" state that indicates that the service instance is starting at the request of an operator, a "stopping" state that indicates that the service instance is being stopped, and a "stopped" state that indicates that the service instance has stopped. Also, it may be that the status for a particular service instance is unknown. These, of course, are by way of example only.

In one example, component 180 obtains the deployment status of the service instances by issuing a query to the service instance pools which maintain the state information for all services instances residing within the pool.

Similarly, component 182 can obtain the allocation status for the service instances by issuing queries to the service instance pools. Examples of allocation states for the service instances include an "allocated" state indicating that the service instance has been attached or assigned to an end user, and a "de-allocated" state which indicates that a service instance is not allocated to the end user (e.g., a trial or subscription period for a service has ended and the service is no longer available to the end user). Other allocation states can include, but are not limited to, a "delete" state that indicates that a service instance is to be deleted, a "preserve" state that indicates that the service instance is being deleted but the data is to be preserved, and a "cleanse" state that indicates that the service instance is ready to be recycled back into the resource pool.

System 118 can also include a health status identification component configured to identify a health status of the service instances. Further, in the illustrated example, each pool 144, 146, and 148 is independently monitored as the deployment and provisioning times may vary across the topologies which the pools possess.

Deployment controller 174 is configured to control deployment of service instances to replenish the service instance pools 144, 146, and 148. Deployment controller 174 does this, in one example, by monitoring the individual characteristics of each service instance pool in determining whether to replenish the service instances within the pool to ensure adequate available service instances to service an expected number of subsequent service requests. As discussed in further detail below, this can be done using pre-defined and/or adjustable thresholds, as well as historical data that indicates a rate of consumption of the service instances within each pool. Also, the deployment of the service instances can be based on the estimated amount of time required to deploy the service instances.

Deployment controller 174 operates to control deployment system 114 to maintain the number of available service instances above a minimum threshold so that there are available service instances to service the subsequent requests. If the number of available service instances in a given pool reaches zero, a service instance will need to be deployed after receiving the service request, which results in a delay to the end user in accessing the service.

Figure 2:
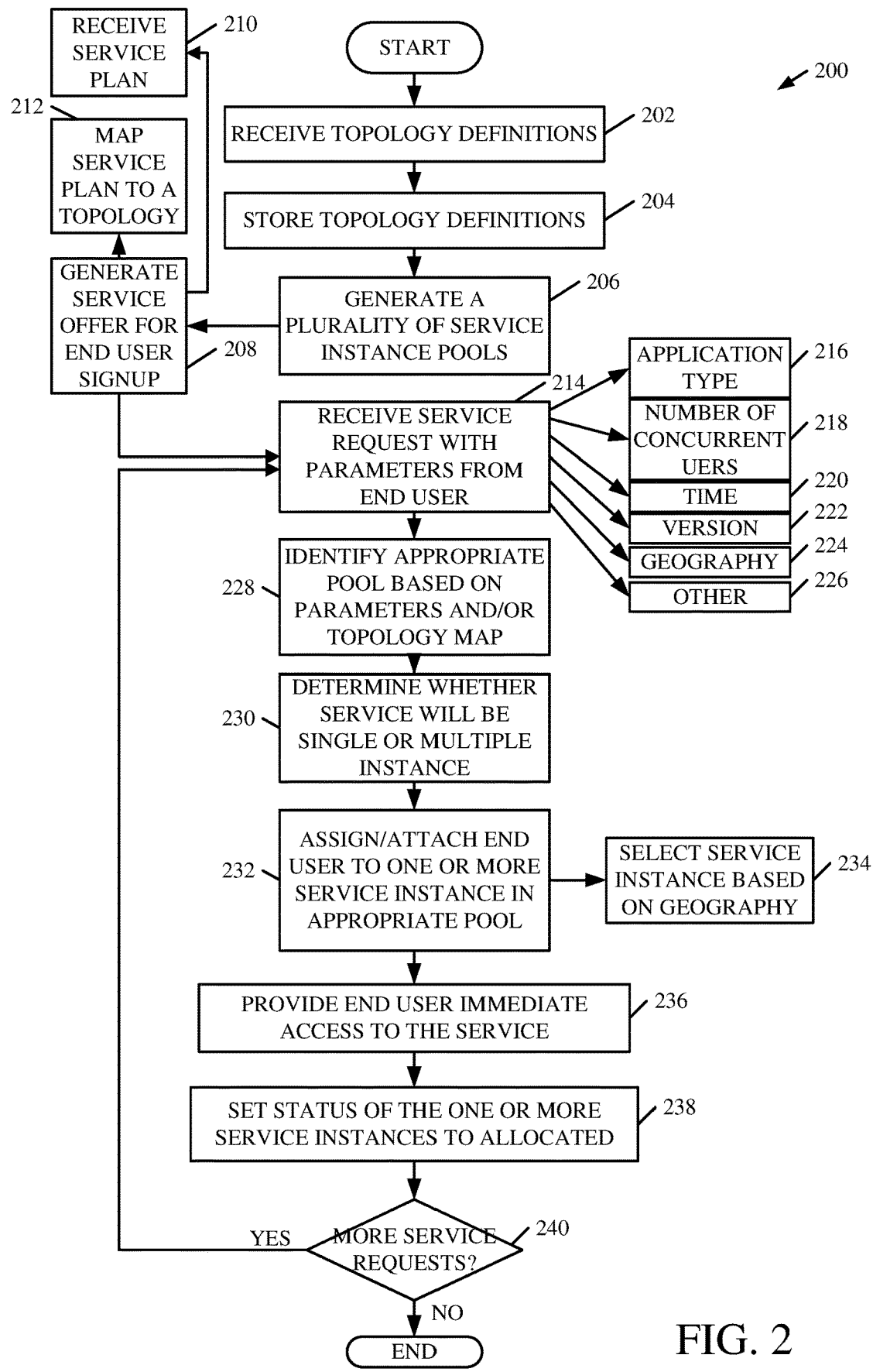
FIG. 2 is a flow diagram of one example of a method for deploying service instances into a set of service instance pools.

FIG. 2 illustrates one example of a method 200 for deploying service instances into a set of service instance pools and provisioning or allocating those service instances to end user requests. For sake of illustration, but not by limitation, method 200 will be described in the context of architecture 100.

At step 202, topology definitions are received. For example, the topology definitions can be received by deployment system 114 from a developer. The topology definitions are stored in data store 156 at step 204. At step 206, a plurality of service instance pools (e.g., pools 144, 146, and 148) are generated. One example of this is illustrated in FIG. 3.

FIG. 3 is a flow diagram of one example of a method 300 for deploying service instances. At step 302, the topology definitions are accessed from data store 156. Deployment system 114 identifies the number and types of the service instance pools based on the topology definitions. For each service instance pool, system 114 determines how many service instances to deploy in the pool. This can be based on a number of expected service requests (represented by block 306), historical data which represents consumption rates (represented by block 308), or other ways as well. This is represented by block 310.

At block 312, the service instances are deployed to the corresponding pools. In one example, at step 314, for each service instance, the deployment status is set to "deploying" and the health of the service is monitored. Once the service instance is deployed, at step 316 the status is set to available to indicate that the service instance is deployed and is available for allocation to an end user.

In one example, at step 318, the system can identify any failed service instances, which can be marked as inactive and removed from the pool at step 320. A service instance may fail deployment for any of a number of reasons including, but not limited to, failing to configure to properly configure the cloud computing resources in accordance with the topology.

Referring again to FIG. 2, at step 208, a service offer is generated for an end user signup. This can include, in one example, system 112 receiving a service plan (represented by block 210) and mapping the service plan to a topology (represented by block 212).

At step 214, a service request is received from an end user with a set of parameters. For example, the parameters can indicate an application type (represented by block 216), a number of concurrent users (represented by block 218), a time period for the service (represented by block 220), a version of the application or service (represented by block 222), and/or geographic parameters (represented by block 224). For example, the geographic parameters for the service request can indicate the geographic location(s) from which some or all of the users will be accessing the service resources. Of course, the service request can include other parameters as well. This is represented by block 226.

At step 228, service controller system 116 identifies the appropriate pool from which to allocate service instance. In one example, this is based on the parameters received at step 214. Alternatively, or in addition, the pool can be identified based on the mapping between the service plan and the topology.

At step 230, service controller system 116 determines whether the service will be single instance or multi-instance. This can be defined in the service offer 124 and/or the service request 126.

At step 232, the end user is attached to one or more of the service instances in the appropriate pool identified from step 228. In one example, service instance allocation component 170 selects the one or more service instances to allocate to the end user based on geography (represented by block 234). If the end users are mainly located in a particular geographic area, service instance allocation component 170 selects the service instance that most appropriately matches that geography. For instance, if the users are largely located in eastern Europe, service instance allocation component 170 selects the service instance that has resources physically residing in a data center in or most closely located relative to eastern Europe. This can ensure that the underlying cloud computing resources are more closely located to the end users which can improve system performance, such as reducing data latency.

At step 236, the end user is provided with immediate, or near immediate, access to the service as the service instances are pre-deployed and readily available for attachment to the end user. At step 238, the status of the one or more service instances is set to "allocated" to indicate that they are allocated to an end user and are not available to service subsequent requests. At step 240, the method determines whether there are any more service requests. If so, the method can return to step 214.

Figure 4A:
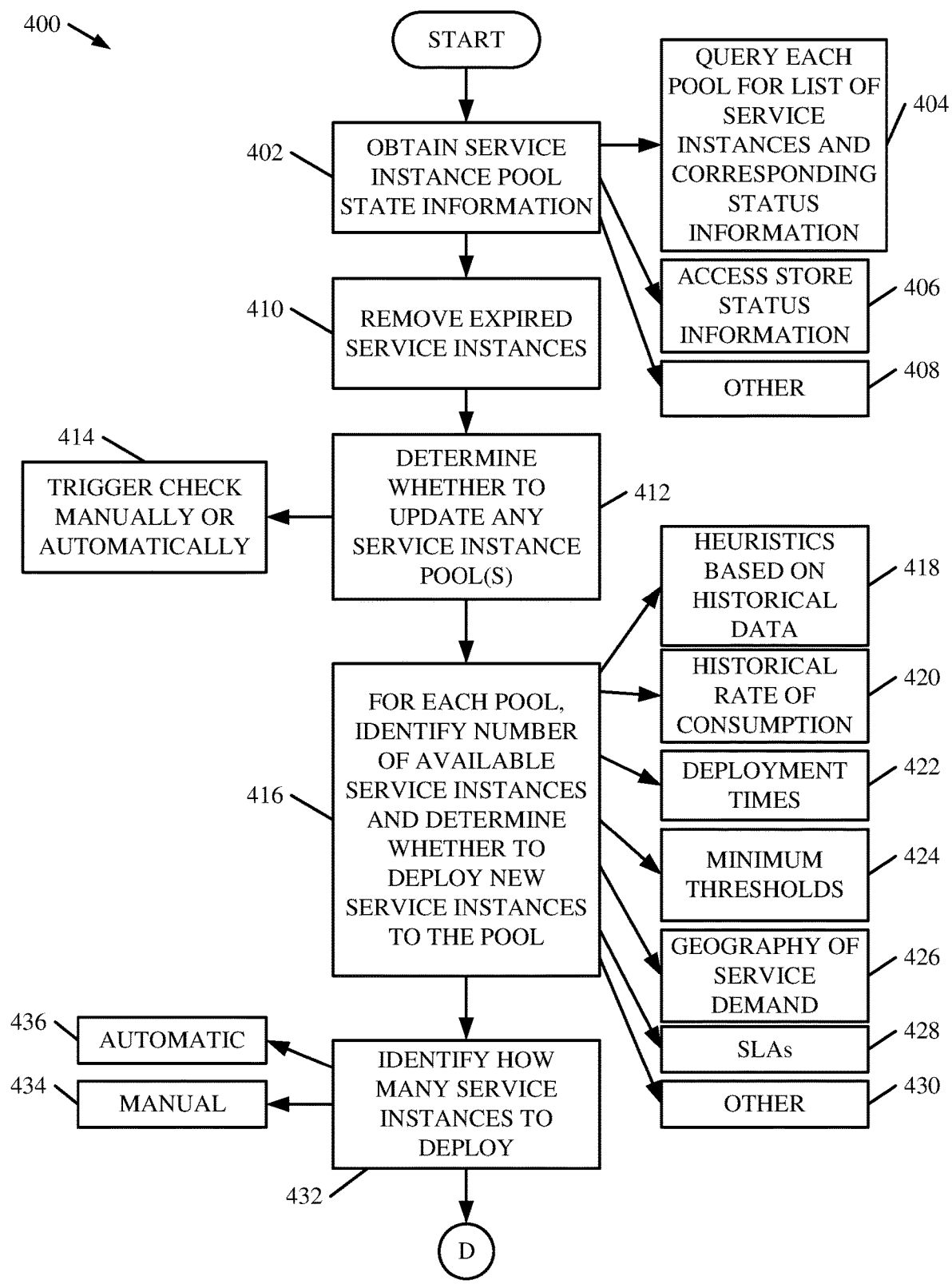
FIGS. 4A and 4B (collectively referred to as FIG. 4) illustrate a flow diagram of one example of a method for replenishing a set of service instance pools.
Figure 4B:
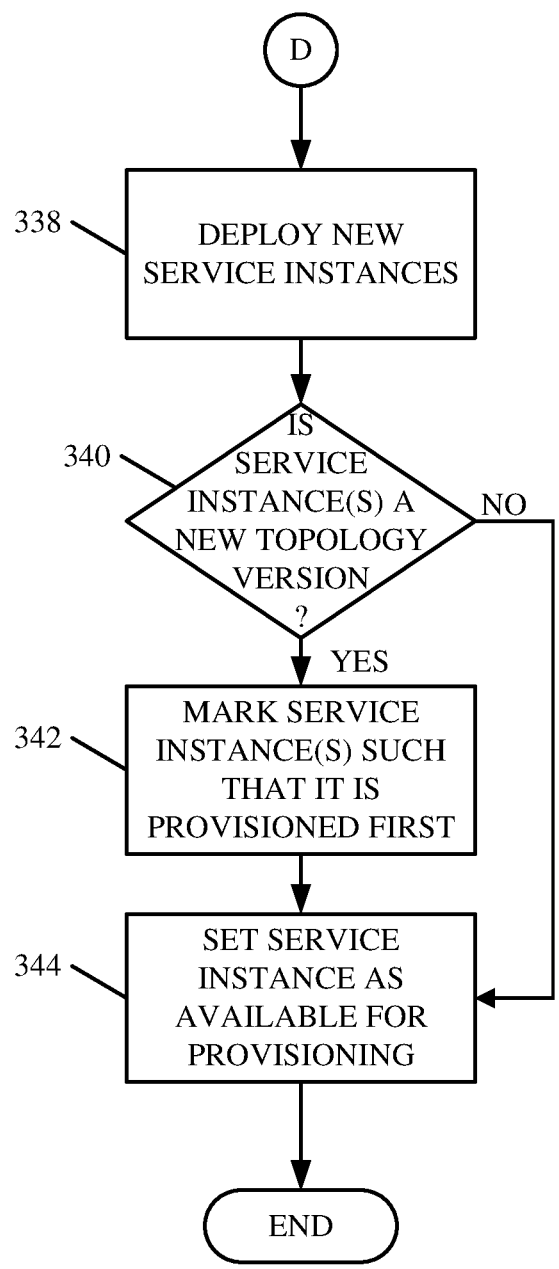

FIG. 4 is a flow diagram of one example of a method 400 for replenishing the service instance pools to prevent the pools from becoming depleted to a level in which subsequent service requests cannot be promptly serviced. For the sake of illustration, but not by limitation, method 400 will be described in the context of architecture 100.

At step 402, service instance pool state information is obtained. For example, this can include components of system 118 querying each service instance pool 144, 146, and 148 for a list of service instances and the corresponding status (e.g., deployment state and allocation state) information. This is represented by block 404. Alternatively, or in addition, system 118 can access stored status information, for example service instance pool state information 186. This is represented by block 406. Of course, the service instance pool state information can be obtained in other ways as well. This is represented by block 408.

At step 410, expired service instances can be removed. Examples of this are discussed above. Briefly, however, an expired service instance can be deleted from a service pool and/or cleansed to recycle the resources for a new service instance.

At step 412, system 118 determines whether to update any of the service instance pools. This determination can be triggered manually and/or automatically. This is represented by block 414. For example, the check can be performed periodically, in response to a user input, and/or in response to deploying a threshold number of service instances.

At step 416, system 118 identifies, for each pool individually, the number of available service instances. Then, system 118 determines whether to deploy new service instances to the pools. Examples of considerations include, but are not limited to, heuristics based on historical data (represented by block 418), an historical rate of consumption (represented by block 420), deployment times for the service instances in the pools (represented by block 422), minimum thresholds for available service instances (represented by block 424), the geography of service demand (represented by block 426), service level agreements established with the end users (represented by block 428), and/or other considerations (represented by block 430).

For sake of illustration, but not by limitation, in one example system 118 analyzes service instance pool 144 to determine that there are a given number available service instances. System 118 also determines a minimum threshold that is set for service instance pool 144. The minimum threshold can be based, for example, on the rate of consumption and the deployment times for the service instances within pool 144. In one example, system 118 calculates an estimated time before all service instances within pool 144 are allocated and thus unavailable. System 118 also determines how long the new service instances will take to deploy. The minimum thresholds can be adjusted based on the rate of consumption, for example.

In one example, the analysis at step 416 can be performed across the service instance pool 144 as a whole. In another example, the service instance pool 144 can be analyzed as a subset of service instances that are divided into geographic regions. For instance, system 118 can determine that there are a minimal number of service instances in given geographic region (e.g., central United States) and that the demand for service instances in that geographic region is relatively high. In response, even though there may be service instances available in other geographic regions, system 118 can determine that service instances should be deployed with resources in that given region.

At step 432, system 118 determines how many instances to deploy. This can be done manually in response to user input (this is represented by block 434) and/or automatically (represented at block 436). In one example, system 118 automatically determines how many new services instances to deploy based on the analysis at step 416.

At step 438, the new service instances are deployed. For example, deployment controller 174 controls deployment system 114 to deploy the service instances to appropriate service instance pools and/or the appropriate geographic regions.

In one example, at step 440, the method determines whether the new service instances are a new topology version. For example, a given topology may be updated by a developer. If so, those service instances can be marked in a manner such that they are the first or next service instances to be provisioned. This is represented at block 442. At step 444, the service instances are set as available for provisioning.

It can thus be seen that the present description provides significant technical advantages. As mentioned above, in illustrated examples, the present description provides an architecture that groups service instances into service instance pools based on topology definitions or other configuration information. In other words, similar service instances are grouped or pooled together and individually monitored and managed to ensure that the pools are sufficiently populated with service instances to subsequent service requests. Accordingly, each pool can be managed to have an optimum, or near optimum, number of available service instances so as to facilitate servicing future end user requests (e.g., to meet SLAs with the end users) without significantly burdening the infrastructure by unnecessarily tying up resources with a large number of unconsumed service instances. As such, the architecture can enable end users to be attached to offered service within minutes of their signup requests for the services, with the service instances being more precisely tailored to the needs of the end user such that there are enough resources for the end user but less unused resources that the end user either did subscribe to or signup for. These unused resources would otherwise allocation to the end user but not be used (or used minimally) This can reduce the overall required resource pool (i.e., pool 102) that needs to be provided within architecture 100. Further, the pools are dynamically replenished to make sure that there are adequate available resources to meet the end user requests.

Further yet, in a multi-tenant environment, pool management involves signups to existing deployed systems where each tenant that signs up receives a portion of a large service deployment. Thus, the activities of one tenant may affect the resources of another tenant, such as by reducing the amount of available resources and potentially degrading the tenant experience. In the present architecture, in one example, the services are independently deployed with scaled characteristics specific for the tenant. Thus, the tenant signs up for a service and is provided with immediate or near immediate access to a dedicated set of resources.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
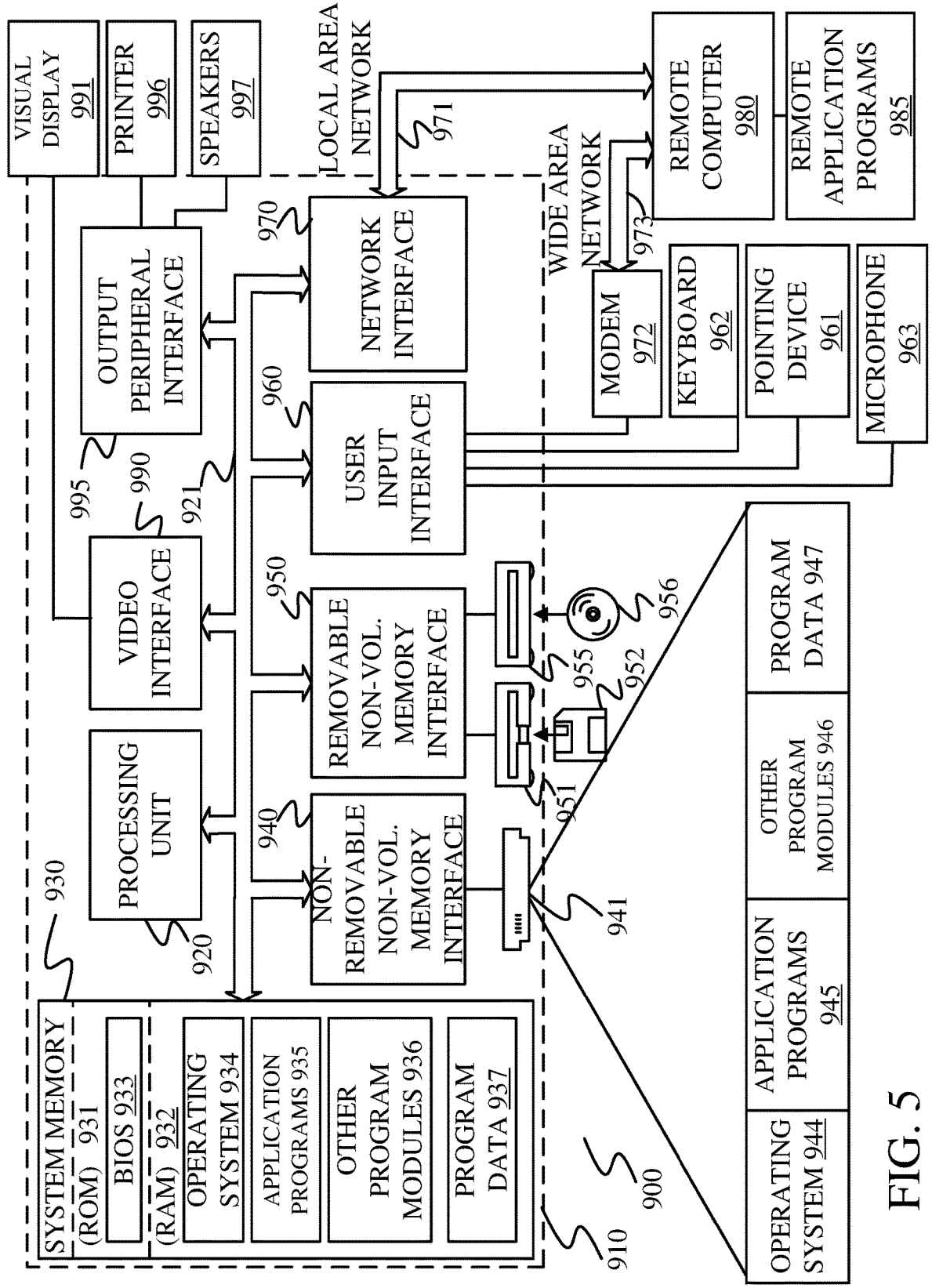
FIG. 5 is a diagrammatic view of one example of a computing environment.

FIG. 5 is a diagrammatic view of one example of a computing environment in which architecture 100, or parts of it, can be deployed. With reference to FIG. 5, an exemplary system for implementing some examples includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 5.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 5 illustrates operating system 934, application programs 935, other program modules 936, and program data 937.

The computer 910 may also include other removable/non-removable volatile/nonvolatile computer storage media. By way of example only, FIG. 5 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 910. In FIG. 5, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 5 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 5 illustrates remote application programs 985 as residing on remote computer 980. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system comprising a service deployment system configured to deploy one or more service instances into a service instance pool, wherein each service instance comprises a computing resource configured in accordance with a service topology and allocable in response to a service request, and a pool management system configured to monitor consumption information related to consumption of the service instance pool and to determine whether to deploy one or more additional service instances to the service instance pool based on the consumption information relative to a threshold metric, wherein the pool management system comprises a deployment controller configured to control the service deployment system to deploy the one or more additional service instances to the service instance pool.

Example 2 is the computing system of any or all previous examples, wherein the consumption information indicates a current number of available service instances in the service instance pool and the threshold metric comprises a threshold that defines a minimum number of available service instances for the service instance pool.

Example 3 is the computing system of any or all previous examples, wherein the deployment controller is configured to control the service deployment system to deploy the one or more additional service instances to the service instance pool if the current number of available service instances in the service instance pool reaches or falls below the threshold.

Example 4 is the computing system of any or all previous examples, wherein the threshold is based on one or more heuristics.

Example 5 is the computing system of any or all previous examples, wherein the consumption information indicates a historical rate of consumption of service instances in the service instance pool.

Example 6 is the computing system of any or all previous examples, wherein the threshold is adjusted based on the historical rate of consumption.

Example 7 is the computing system of any or all previous examples, wherein the pool management system is configured to determine whether to deploy the one or more additional service instances to the service instance pool based on an estimated service deployment time.

Example 8 is the computing system of any or all previous examples, wherein the service instances have computing resources that are distributed across a number of different geographic regions, and wherein the consumption information indicates a historical rate of consumption of service instances in each geographic region.

Example 9 is the computing system of any or all previous examples, wherein the deployment controller is configured to select a particular one of the geographic regions based on the historical rate of consumption, and to control the service deployment system to deploy the one or more additional service instances such that the one or more additional service instances comprise computing resources in the particular geographic region.

Example 10 is the computing system of any or all previous examples, wherein the service deployment system is configured to generate a plurality of service instance pools, each service instance pool comprising an available service instance generated in accordance with a different service topology.

Example 11 is the computing system of any or all previous examples, wherein the pool management system is configured to monitor and manage the service instances pools independently from one another.

Example 12 is the computing system of any or all previous examples, wherein the pool management system comprises a service instance allocation state identification component configured to identify and store allocation state information for the service instance pool.

Example 13 is the computing system of any or all previous examples, wherein the pool management system comprises a service instance deployment state identification component configured to identify and store deployment state information for the service instance pool.

Example 14 is the computing system of any or all previous examples, wherein the pool management system obtains the allocation state information and the deployment state information by querying the service instance pool.

Example 15 is the computing system of any or all previous examples, wherein the pool management system is configured to identify and remove an expired service instance from the service instance pool.

Example 16 is the computing system of any or all previous examples, wherein the pool management system is configured to determine whether user data in the expired service instance is to be preserved, and to preserve the user data based on the determination.

Example 17 is a computer-implemented method comprising one or more service instances to a service instance pool, wherein each service instance comprises one or more computing resources configured in accordance with a service topology and allocable in response to a service request, monitoring consumption information that indicates a historical rate of consumption of the service instance pool, determining whether to deploy one or more additional service instances to the service instance pool based on the consumption information relative to a threshold metric, and deploying the one or more additional service instances to the service instance pool.

Example 18 is the computer-implemented method of any or all previous examples, wherein the consumption information indicates a current number of available service instances in the service instance pool and the threshold metric comprises a threshold that defines a minimum number of available service instances for the service instance pool, and wherein deploying comprises deploying the one or more additional service instances to the service instance pool if the current number of available service instances in the service instance pool reaches or falls below the threshold.

Example 19 is a computing system comprising a service deployment system configured to deploy service instances into a plurality of different service instance pools, wherein the service instances in each service instance pool comprise a computing resource configured in accordance with a different service topology, and a pool management system configured to monitor consumption information related to consumption of service instances from each of the service instance pools and, for each service instance pool, to determine whether to deploy one or more additional service instances to the service instance pool based on the consumption information for the service instance pool.

Example 20 is the computing system of any or all previous examples, wherein the consumption information indicates a current number of available service instances in each service instance pool, and wherein the pool management system is configured to identify, for each service instance pool, a threshold metric that defines a minimum number of available service instances for the service instance pool.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A method performed by a computing system, the method comprising:
    assigning service instances from a service instance pool in response to service requests, each service instance comprising a computing resource configured based on a service topology;
    obtaining consumption information indicative of a historical rate of assignment of the service instances from the service instance pool;
    determining an estimated service deployment time indicative of an estimated time to deploy, to the service instance pool, an additional service instance by configuring a computing resource in accordance with the service topology and adding the configured computing resource to the service instance pool;
    setting a minimum threshold for a number of unassigned service instance in the service instance pool based on:
        the consumption information indicative of consumption of the service instances, and
        the estimated service deployment time; and
    based on a determination that a current number of service instances in the service instance pool is less than the minimum threshold, controlling deployment of the additional service instance to the service instance pool.

2. The method of claim 1, wherein the consumption information indicates a historical rate of assignment of service instances, from the service instance pool, to an end user request.

3. The method of claim 1, and further comprising:
    instantiating the additional service instance by:
        selecting the computing resource from a computing resource pool associated with the computing system, and
        configuring the selected computing resource in accordance with the service topology that defines a hosted service; and
    deploying the instantiated service instance into the service instance pool, the service instance pool comprising one or more unassigned service instances, wherein each unassigned service instance in the service instance pool comprises a virtual machine and is configured to be assigned to a client computing system, in response to a service request from the end user computing system to host the hosted service for the end user computing system.

4. The method of claim 3, wherein the consumption information indicates a current number of available service instances in the service instance pool and the threshold defines a minimum number of unassigned service instance for the service instance pool.

5. The method of claim 1, and further comprising:
    generating a plurality of service instance pools, each service instance pool comprising an available service instance comprising a virtual machine generated in accordance with a different service topology; and
    for each service instance pool, monitoring consumption information for the service instances pool independent from other service instance pools.

6. The method of claim 1, and further comprising:
    identifying an expired service instance in the service instance pool; and
    removing the expired service instance from the service instance pool.

7. The method of claim 6, and further comprising determining whether user data in the expired service instance is to be preserved, and preserving the user data based on the determination.

8. A computer-implemented method comprising:
    obtaining consumption information indicative of a historical rate of assignment of service instances from a service instance pool, each service instance comprising a computing resource configured based on a service topology;
    determining an estimated service deployment time indicative of an estimated time to deploy, to the service instance pool, an additional service instance by configuring a computing resource in accordance with the service topology and adding the configured computing resource to the service instance pool;
    setting a minimum threshold for a number of unassigned service instance in the service instance pool based on:
        the consumption information indicative of consumption of the service instances, and
        the estimated service deployment time; and
    based on a determination that a current number of service instances in the service instance pool is less than the minimum threshold, controlling deployment of the additional service instance to the service instance pool.

9. The computer-implemented method of claim 8, wherein controlling deployment comprises determining that the current number of services instances will fall below the minimum threshold based on the consumption information and the estimated time, and controlling deployment of the one or more additional service instances to the service instance pool based on the determination.

10. The computer-implemented method of claim 8, and further comprising:
instantiating additional service instance by:
selecting the computing resource from a computing resource pool associated with the computing system, and
configuring the selected computing resource in accordance with the service topology that defines a hosted service; and
deploying the instantiated service instance into the service instance pool, the service instance pool comprising one or more unassigned service instances, wherein each unassigned service instance in the service instance pool comprises a virtual machine and is configured to be assigned to a client computing system, in response to a service request from the end user computing system to host the hosted service for the end user computing system.

11. The computer-implemented method of claim 8, and further comprising:
identifying an expired service instance in the service instance pool; and
removing the expired service instance from the service instance pool.

12. The computer-implemented method of claim 11, and further comprising determining whether user data in the expired service instance is to be preserved, and preserving the user data based on the determination.

13. A computing system comprising:
a processor; and
memory storing instructions executable by the processor, wherein the instructions, when executed, cause the computing system to:
assign service instances from a service instance pool in response to service requests, each service instance comprising a computing resource configured based on a service topology;
obtain consumption information indicative of a historical rate of assignment of the service instances from the service instance pool;
determine an estimated service deployment time indicative of an estimated time to deploy, to the service instance pool, an additional service instance by configuring a computing resource in accordance with the service topology and adding the configured computing resource to the service instance pool;
set a minimum threshold for a number of unassigned service instance in the service instance pool based on:
the consumption information indicative of consumption of the service instances, and
the estimated service deployment time; and
based on a determination that a current number of service instances in the service instance pool is less than the minimum threshold, control deployment of the additional service instance to the service instance pool.

14. The computing system of claim 13, wherein the instructions cause the computing system to:
instantiate the additional service instance by:
selecting the computing resource from a computing resource pool associated with the computing system, and
configuring the selected computing resource in accordance with the service topology that defines a hosted service; and
deploy the instantiated service instance into the service instance pool having one or more unassigned service instances, wherein each unassigned service instance comprises a virtual machine and is assignable to host the hosted service for a client computing system in response to a service request from the client computing system.

15. The computing system of claim 14, wherein the consumption information indicates a current number of available service instances in the service instance pool and the threshold defines a minimum number of unassigned service instance for the service instance pool.

16. The computing system of claim 13, wherein the instructions cause the computing system to:
generate a plurality of service instance pools, each service instance pool comprising an available service instance comprising a virtual machine generated in accordance with a different service topology; and
for each service instance pool, monitor consumption information for the service instances pool independent from other service instance pools.

17. The computing system of claim 13, wherein the instructions cause the computing system to:
identify an expired service instance in the service instance pool; and
remove the expired service instance from the service instance pool.

18. The computing system of claim 17, wherein the instructions cause the computing system to determine whether user data in the expired service instance is to be preserved, and to preserve the user data based on the determination.

* * * * *